United States Patent [19]
Munson

[11] 4,277,733
[45] Jul. 7, 1981

[54] SLIP RECOVERY SYSTEM FOR WOUND ROTOR MOTOR

[75] Inventor: William A. Munson, Amherst, N.Y.

[73] Assignee: Westinghouse Electric Corp., Pittsburgh, Pa.

[21] Appl. No.: 17,666

[22] Filed: Mar. 5, 1979

[51] Int. Cl.$^3$ ............................................. H02P 7/36
[52] U.S. Cl. .................................................... 318/732
[58] Field of Search ................ 318/731, 732, 821–823; 363/68, 71

[56] References Cited

U.S. PATENT DOCUMENTS

| | | | |
|---|---|---|---|
| 3,504,254 | 3/1970 | Rosenberry, Jr. | 318/732 |
| 3,515,969 | 6/1970 | Magnuson et al. | 318/732 |
| 3,521,137 | 7/1970 | Van Sweden | 318/732 |
| 3,683,251 | 8/1972 | Pisecker | 318/732 X |
| 3,781,635 | 12/1973 | Sauer | 363/71 X |
| 4,030,006 | 6/1977 | Elger | 318/732 |

Primary Examiner—Gene Z. Rubinson
Attorney, Agent, or Firm—C. M. Lorin

[57] ABSTRACT

A slip recovery system for a wound rotor induction motor is disclosed in which first and second inverters, connected in series, are coupled to the rotor of the induction motor. A switch is arranged in parallel with the second of these inverters, the switch being in the open position during starting and stopping of the motor, and being closed to short out the second inverter during normal running conditions. Thus, the first inverter need have only a voltage rating of such magnitude so as to satisfy the expected operating range for the wound rotor, while the second inverter need have only a voltage rating of sufficient magnitude to satisfy the additional capacity requirements for stopping and starting service. Thus, lower rated inverter components may be used with lower initial costs as well as concomitant lower operating costs.

4 Claims, 2 Drawing Figures

SLIP RECOVERY SYSTEM FOR WOUND ROTOR MOTOR

BACKGROUND OF THE INVENTION

1. Field of the Invention

This invention relates to a slip recovery system for a wound rotor motor.

2. Description of the Prior Art

In speed control drives for wound rotor induction motors, the slip-frequency power is recovered by the use of additional rotating machines or by converters. These drives are classically categorized as being either of the constant horsepower or constant torque type, the identification having reference to the inherent limitation in power based on full current and flux in the main machine. In the constant horsepower drive, the auxiliary machine is mounted on or mechanically coupled to the shaft of the main machine. The slip energy is converted into mechanical energy and returned to the main motor shaft by the auxiliary machine. In the constant torque system, the slip energy is converted into electrical energy of the frequency and voltage of the voltage supply, and is returned or fed back to the supply. Since this power is not delivered to the main motor shaft, the auxiliary machine is not mechanically coupled to the motor shaft but is separately driven. The limiting torque of the main motor being constant, the maximum horsepower output is proportional to the operating speed.

The emergence of silicon controlled rectifiers (SCR's) with increasingly higher current ratings, has given impetus to solid-state packaged drives for polyphase motors. In the solid-state version of the slip energy recovery system, the slip ring power is rectified in a diode bridge, and then passed over a DC link to a supply line commutated inverter that returns the slip power to the voltage supply. The speed of the main motor is controlled by the firing angle of the SCR's which comprise the inverter. Slip recovery systems of this type are economical for narrow speed ranges such as for fans and pumps or where the horsepower rating of the induction motor is so large that the costs of the controls are therefore of minimal significance.

SUMMARY OF THE INVENTION

A slip energy recovery system is claimed for a wound rotor induction motor having a stator connected to a polyphase AC voltage supply and a rotor coupled to a useful load. First and second inverters, connected in series, have their inputs respectively coupled to the rotor. A feedback path connected to the outputs of the inverters, couples the inverter outputs in a regeneration path back to the AC supply voltage. Switching means connected in parallel with the second inverter, having open and closed positions, are operated in the open position during starting and stopping of the induction motor and in the closed position during normal running operations.

DESCRIPTION OF THE PREFERRED EMBODIMENT

Figure 1:
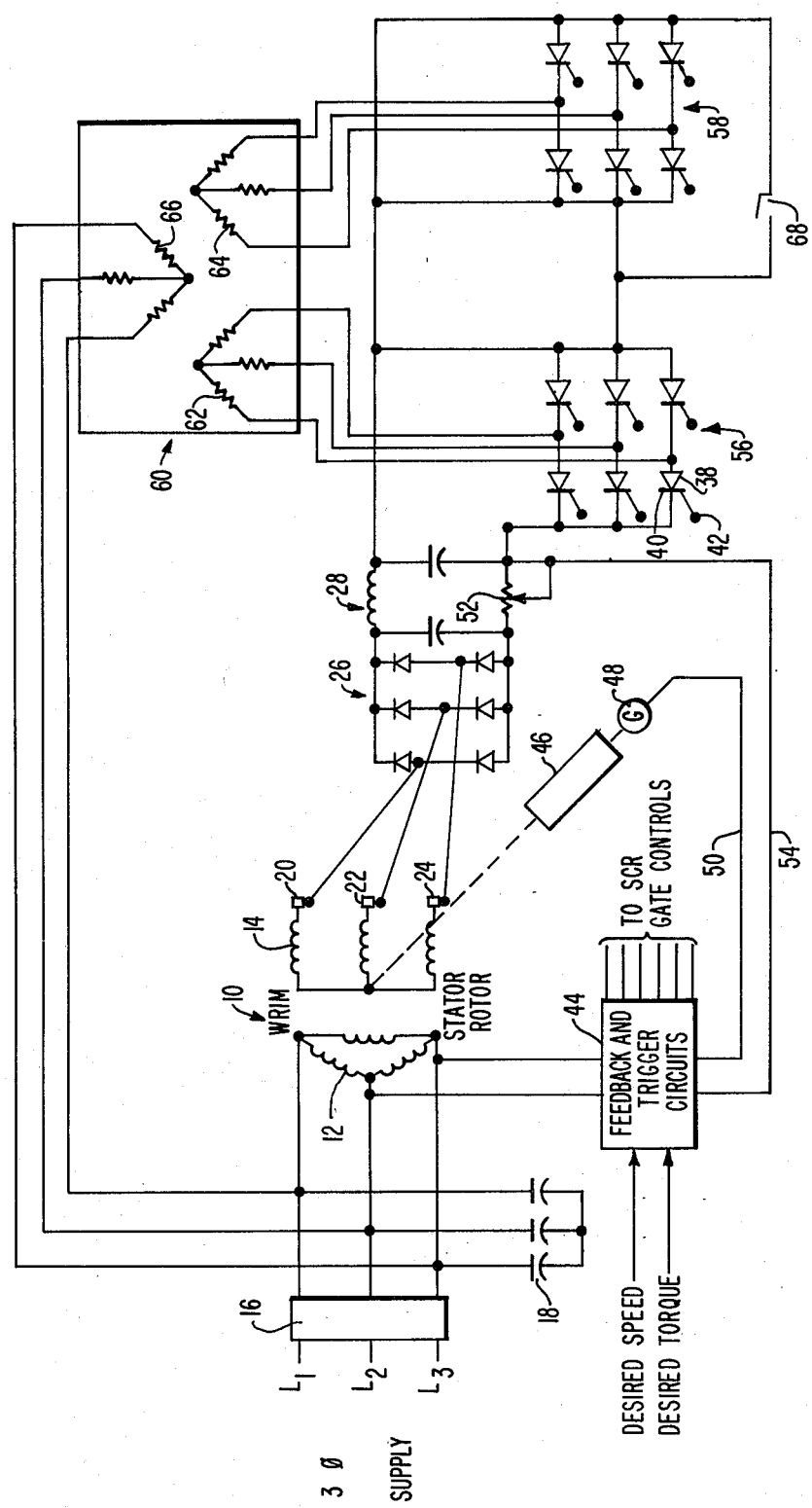
FIG. 1 is an electrical schematic of the electronic slip power control system for a wound rotor induction motor in accordance with the invention.

The instant invention for electronic slip power control for a wound rotor induction motor (WRIM) is shown in FIG. 1. Before describing the FIG. 1 embodiment reference will first be made to the prior art embodiment shown in FIG. 2.

Figure 2:
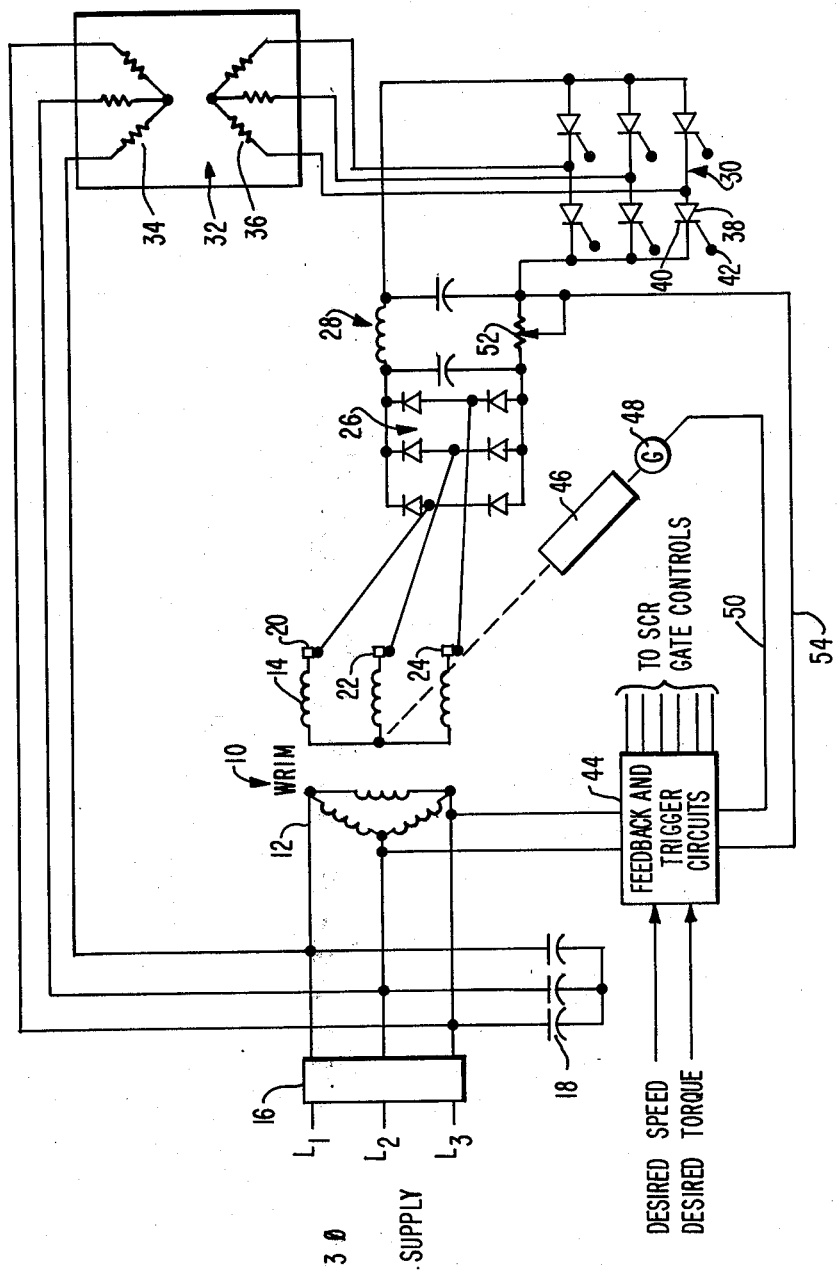
FIG. 2 is an electrical schematic of a prior art electronic slip power control system.

The control system shown in FIG. 2 is for an automatically torque regulated AC adjustable speed drive. A wound rotor induction motor, indicated generally at 10, comprises a stator 12 and a rotor 14. The stator 12 is connected to a three-phase supply through primary protection and disconnect equipment shown symbolically at 16. A bank of power factor correction capacitors 18 may be included if desired. The rotor is connected to slip rings shown symbolically at 20, 22 and 24. The slip rings 20, 22, 24 are connected to a three-phase full-wave rectifier, comprising a six-diode bridge section indicated generally at 26, which is rated for the rotor output. The output of the full-wave rectifier 26 is applied to AC smoothing filter indicated generally at 28. The filter 28 is connected across an inverter bank 28 comprising silicon controlled rectifiers (SCR's) indicated generally at 30. A transformer, indicated generally at 32, has a three-phase primary winding 34 and a three-phase secondary winding 36. The transformer 32 is optional and is used where it is necessary to match the output of inverter 30 to the available AC power supply. The inverter bank 30 comprises six substantially identical silicon controlled rectifiers (SCR's) only one of which will be identified. Each SCR comprises an anode 38, a cathode 40 and a gate 42. The SCR's are fired by the application of a gating signal to one of the gates such as 42. The gating of the inverter bank 30 is through feedback and trigger circuits indicated symbolically at 44. The useful load indicated symbolically at 46 is coupled to a tachometer generator 48 which develops a signal proportional to the speed of the load 46 and sends it via line 50 to the feedback and trigger circuit 44. A torque transducer shown symbolically at 52 develops a torque feedback signal which is sent by line 54 to the feedback and trigger circuit 44.

Briefly, the AC voltage induced in the WRIM rotor 14 is rectified in the full-wave bridge 26 to a DC level, which is fed through the filter 28 directly to the inverter 30. The SCR inverters are triggered at an inverting rate established by the frequency of the three-phase line so that the inverter output is maintained at constant frequency. The AC single phase tachometer generator 48 provides an indication of output motor speed. The tap-on resistor 52 senses the rectified current in the rotor secondary circuit, and provides a signal which is a function of the torque developed by the induction motor 10. Together the two feedback signals are summed to provide signals to the trigger circuitry 44 for controlling the inverter firing angles and therefore the inverter regenerative output voltage and power. Upon energizing the system by closing the primary protection and disconnect equipment 16, both the motor 10 and the transformer 32 are energized—the system is ready to be started. Initially no current flows in the rotor 14 since the inverter 30 is not operating and hence no torque or motor rotation results. By turning on the inverter 30 at its full voltage output, the system will be operational, but the motor 10 will not develop any torque until the voltage is reduced to a level that will permit rotor current to flow. As the voltage output of inverter 30 is reduced, current is permitted to flow in the rotor circuit since its voltage output (which is rectified to DC by the three-phase full-wave bridge 26) is greater than the counter voltage being developed by the inverter 30. The mechanical outputs of the motor—both torque and speed—are controlled over its entire range of operation by varying the voltage output of inverter 30 from maximum opposing voltage to a minimum or zero voltage output. Since horsepower is a direct function of torque and speed (i.e., horsepower=KTS), when the applied torque of the load momentarily goes down thus tending to increase the speed, the feedback control circuitry 44 gates the SCR's of the inverter 30 so as to regenerate more AC power to the three-phase supply, thereby restoring the applied torque to the rotor 14 and maintaining the same speed and torque on the motor 10.

In the invention of FIG. 1, the equipment which is the same as that of FIG. 2 has been identified with the same numerals. The control system of FIG. 1 is the same as that of FIG. 2 except that the inverter now comprises two sections, indicated generally at 56 and 58, each comprising six SCR's. Additionally, the transformer 60 now comprises secondaries 62 and 64 connected to the outputs of the inverters 56 and 58 respectively. The primary 66 of transformer 60 is connected to the three-phase power supply. The inverter 58 is shunted by a disconnect switch shown symbolically at 68. The inverters 56 and 58 are usually rated at half the voltage capacity of the rotor 14, and the voltage matching transformer 60 is a three-winding unit, i.e., one primary 66 and two secondary windings 62, 64.

The operation of the system of FIG. 1 is as follows. When starting, both inverter 56 and inverter 58 are at full voltage. As the motor current (torque) and speed are increased, the inverter 58 is reduced toward zero voltage output. During this period inverter 56 is held at maximum voltage output. When inverter 58 reaches zero voltage output, the shorting switch 68 (connected across its output) is closed, and inverter 58 is then shorted out and eliminated for the remainder of system operation. (The shorting switch 68 is again opened during stopping as will be explained). The system will then operate exactly as described in connection with FIG. 2, control being realized by means of the single inverter 56, that is, full voltage output from the inverter 56 will give 50% speed, and reducing this voltage output to zero will permit increasing the motor speed to the top rating of the motor 10.

In stopping the induction motor 10, the output of inverter 56 is increased from its then operating value to its full or 100% magnitude. The shorting switch 68 is then opened and inverter 58 is now back on the line at zero output voltage. Once the shorting switch 68 has been opened, (transferring rotor current to the inverter 58), the output of inverter 58 is increased from its zero output level to its maximum value, causing the motor 10 output to be brought to a stop. Thus the rotor current (torque) is reduced to zero by virtue of opposing voltage supplied by the inverters 56 and 58 in series, i.e., inverter 56 at maximum voltage added to the increasing voltage output from the inverter 58.

The advantages of the FIG. 1 arrangement over the prior art are many. By reason of the fact that two inverters are used, the voltage rating of each inverter can be one-half that of the single inverter system of the prior art shown in FIG. 2. However, it should be noted at this point that this one-half rating for the inverters is not a requirement in the practice of this invention. Thus, the first inverter need have only a voltage rating sufficient to satisfy the expected running range for the wound rotor motor, with the second inverter (the one which is shorted out) having a voltage rating of sufficient magnitude to satisfy the additional capacity requirements imposed by starting and stopping service. This results in lower inverter losses since lower voltage rated SCR's can be used.

Secondly, the matching transformer 60 can have a reduced rating—up to as much as 43% by proper selection of the secondary windings 62 and 64. For example:

Inverter 1—100% Rotor Sec. I, 50% of Rotor Sec. Voltage.

Inverter 2—25% Rotor Current, 50% of Rotor Voltage.

The primary winding rating is required to match only the KVA rating of inverter I, since when both secondaries are in use, in the speed range from 0 to 50% of rated speed, only 25% of rotor current needs to be handled. Thus, the transformer rating by comparison with the normal 100% speed range, two-winding unit, is greatly reduced.

Thirdly, by reducing the inverter ratings to one-half that of the rotor rating for the operating range, the KVAR's generated by the inverter 56 at top speed are one-half those generated by the full-range unit (i.e., inverter 30 of FIG. 2) and the power factor correction capacitor bank 18 (when required) may be reduced to approximately one-half the value of the power factor correction capacitor bank 18 used with the single inverter of FIG. 2.

Further, by using a reduced rating for the inverter 56, the harmonic currents flowing into the power source will be reduced since they are proportional to rating of the inverter used.

Thus, the multiple inverter, multiple secondary winding transformer arrangement of FIG. 1 provides all the advantages of the full-range (0–100%) electronic slip power control of FIG. 2, with lower equipment cost, higher efficiency of operation, and reduced power source disturbance.

I claim:

1. A slip recovery system for a wound rotor induction motor having a stator connected to a polyphase AC supply voltage, and a rotor coupled to a useful load comprising: a first inverter coupled to said rotor; a second inverter, in series with said first inverter, and coupled to said rotor; a feedback path coupling the outputs of said first and second inverters to said AC supply voltage; and means for switching connected in parallel with said second inverter, having open and closed positions, whereby said switching means is operated in the open position during starting and stopping said motor, and in said closed position during running operation.

2. A slip recovery system according to claim 1 whereby a transformer is interposed in said feedback path, said transformer having a primary winding coupled to said AC supply and dual secondary windings coupled to said first and second inverters respectively.

3. A slip recovery system according to claim 1 whereby said first and second inverters comprise silicon controlled rectifier bridges respectively.

4. A slip recovery system according to claim 3 comprising a speed feedback path, a torque transducer, and a feedback trigger circuit, said speed feedback path being coupled to said load to derive a speed feedback signal, said torque transducer being coupled to said rotor to derive a torque feedback signal, said feedback trigger circuit being coupled to said silicon controlled rectifier bridges, said feedback signals being connected to said feedback trigger circuit to control the regeneration output of said silicon controlled rectifier bridges fed back to said AC voltage supply.

* * * * *